March 14, 1967 W. R. EPPERLY ET AL 3,309,311
MOLECULAR SIEVE SEPARATION PROCESS
Filed Oct. 28, 1964

William R. Epperly
William J. Asher    Inventors

By Perry Carvellas
            Patent Attorney

United States Patent Office 3,309,311
Patented Mar. 14, 1967

3,309,311
MOLECULAR SIEVE SEPARATION PROCESS
William R. Epperly, New Providence, and William J. Asher, Cranford, N.J., assignors to Esso Research and Engineering Company, a corporation of Delaware
Filed Oct. 28, 1964, Ser. No. 407,111
20 Claims. (Cl. 208—310)

The present invention is concerned with improving the overall efficiency of the molecular sieve separation process. More particularly, the invention relates to an improved process for the separation of lighter hydrocarbons, the hydrocarbons may be either aromatic or non-aromatic in nature. This invention is further applicable to the separation of lighter weight normal hydrocarbons, such as the lighter normal paraffins falling into the range of $C_2$–$C_{16}$, more particularly, $C_4$–$C_{12}$, and, most particularly, $C_5$–$C_9$. However, the invention is also applicable to separations involving lighter normal olefins, in the same range as the previously enumerated paraffins as well as aromatics. This invention may be utilized to separate aromatics having a molecular weight of $C_{16}$ or less, preferably $C_{12}$ or less and in its most preferred form $C_9$ or less.

It has been unexpectedly found that when sievate is passed into a bed loaded with a displacing agent, which has a high affinity for the molecular sieve material, a large proportion of the displacing agent is rapidly desorbed from the sieve. In the case of smaller pore molecular sieves, that is to say molecular sieves having a pore opening of 3 to 6 A. units, the sievate does not displate the displacing agent on the sieve itself but rather serves to reduce the partial pressure of the desorbent over the sieve within the molecular sieve separation zone. This ability to desorb is totally unexpected since the desorption is being carried out with material which has no affinity for the molecular sieve itself whereas the material which is being displaced from the sieve has an exceedingly high affinity. In the case of larger pore molecular sieves, those sieves having Angstrom openings of 8 to 15 or more Angstroms units, the sievate may be adsorbed but the adsorption is not nearly as pronounced as the adsorptive capacity for the particularly displacing agents utilized. Despite this limited attraction the sievate may be effectively utilized to remove the closely held displacing agent from the sieve. Due to the fact that the displacing agent is no longer on the sieve, a far greater affinity for lighter hydrocarbons exists when feedstock is again introduced into the molecular sieve separation zone.

The desorbents which may be used in accordance with this invention are highly polar compounds. The sieve materials that can be used in accordance with the present invention are the molecular sieve materials which have the capacity to separate hydrocarbons either by basis of molecular size as exemplified by normal paraffins from non-normal paraffins or by affinity of the hydrocarbon for the sieve material, this principle is used to separate aromatics from other materials.

It has been known for some time that certain zeolites, both naturally occurring and synthetic, have the property of separating normal from isometric branched chain hydrocarbons as well as cyclic and aromatic admixtures. The zeolites have crystal patterns such as deformed structures containing a large number of small cavities interconnected by a number of still smaller holes or pores, the latter being of exceptionally uniform size. Only molecules small enough to enter the pores can be adsorbed, though not all molecules, even though small enough to enter the pores, will be adsorbed. An affinity of the molecule for the adsorbent must be present. The pores may vary in diameter from 3 to 6 A. units to 8 to 15 or more A. units, but it is a property of these zeolites or molecular sieves that for a particularly size the pores are of substantially uniform size. The adsorbents with pore sizes of 8 to 15 A. units have a high selectivity for aromatic and non-normal hydrocarbons whereas the smaller adsorbents with respect to pore size, that is to say about 3 to 6 A. units, have a higher selectivity for straight chain compounds such as normal paraffins and normal olefins. The adsorbents with pore size of 8 to 15 A. units are known as type X sieves.

The scientific and patent literature contain numerous references to the adsorbing action of natural and synthetic zeolites. Among the natural zeolites having this sieve property may be mentioned chabasites and analcite. A synthetic zeolite with molecular sieve properties is described in U.S. Patent 2,442,191. An example of a class of synthetic zeolites which is used to separate normal hydrocarbons from branched hydrocarbons is type A sieve with divalent cations from the alkaline earth sieves, particularly calcium type A. These adsorbents are described in U.S. Patent 2,882,243. An example of a class of adsorbents which is used to separate aromatics and nonhydrocarbons from saturates is type X sieve with monovalent and divalent cations from the alkaline and alkaline earth sieves, particularly sodium and calcium type X. The adsorbents are described in U.S. Patent 2,882,244. Zeolites vary somewhat in composition but generally contain silica, aluminum, oxygen and an alkali and/or alkaline earth element, e.g., sodium and/or calcium, magnesium, etc. Analcite has the empirical formula: $NaAlSi_2O_6 \cdot H_2O$. Barrer (U.S. Patent 2,306,610) teaches that all or part of the sodium is replaceable by calcium to yield on dehydration, a molecular sieve having the formula: $(CaNa_2)Al_2Si_4O_{12} \cdot 2H_2O$. Black (U.S. Patent 2,522,426) describes a synthetic molecular sieve having the formula $4CaO \cdot Al_2O_3 \cdot 4SiO_2$. A large number of other naturally occurring zeolites having molecular sieve activity, i.e., the ability to adsorb a straight chain hydrocarbon and exclude the branched chain isomers, are described in an article, "Molecular Sieve Separation of Solids," appearing in Quarterly Reviews, vol. 3, 293–330 (1949), and published by the Chemical Society (London).

The separation of normal from branched chain or aromatic hydrocarbons or mixtures, either for the purpose of enriching the mixture in the branched chain, cyclic or aromatic components, or for isolating and recovering of the normal isomer, has become an increasingly important industry. Thus, in the preparation of jet and diesel fuels, the presence of normal paraffins degrades the freezing point rating. On the other hand, in the manufacture of synthetic detergents such as alkylaryl sulfonates, a straight chain alkyl substituent makes for better detergency and biodegradable characteristics than a branched chain constituent of the same number of carbon atoms. Such detergents can be prepared using normal paraffins or normal olefins. Numerous other examples can be cited.

Of particular importance in recent years is the increased demand for high octane fuels for use in both automobile and airplane engines. The lighter normal paraffins, i.e., those in the $C_2$–$C_{16}$ range and, in particular, in the $C_4$–$C_{12}$ or $C_5$–$C_9$ range, are well-known for their detrimental effect of lowering the octane number in a fuel. That is to say, the removal of these lower weight normal paraffins serves to markedly increase the octane rating of a given fuel.

Traditionally, the separation of a molecular sieve type has involved the passing of a feedstock containing an adsorbable material into a molecular sieve containing adsorption zone. A portion of the feedstock is adsorbable and consequently is adsorbed onto the molecular sieve.

The remainder of the feedstock, which in the case of smaller sieves is non-adsorbable and in the case of larger sieves has less affinity for the sieve, passes out of the molecular sieve separation zone as sievate. Once the separation has been carried out in order to recover the adsorbed material, it is necessary to desorb it from the sieve. There are several techniques for doing this, among which are heating the sieve, applying a vacuum or a combination of both. It is also known to desorb the adsorbed material by displacing the adsorbed material with another hydrocarbon of a different boiling point. None of these methods have met with the total success in desorption which would be required in order to present a financially attractive system.

To overcome this problem, it has been suggested to use a highly polar material which may be ammonia or a variety of other amines as well as several well-known small polar molecules. These displacing agents will subsequently be discussed at great length. This technique has been very successful in removing adsorbed hydrocarbons substantially completely from the sieves.

On the next adsorption cycle, however, when feed was reintroduced into the bed it has been found that the presence of the displacing agent serves to inhibit the amount of light hydrocarbon which may be adsorbed onto the molecular sieve. This is true with both small and larger pore molecular sieves. Thus, it has been found to be applicable to a normal paraffin separation involving the use of a 5 A. sieve as well as an aromatic separation which requires the use of a 13X sieve. Sufficient light components have not been recovered by this method. Consequently, a need has arisen to find a method for efficiently removing the displacing agent from the sieve prior to the introduction of additional feed stock.

This invention is based on the unexpected finding that when sievate is passed into a molecular sieve bed, the said bed having either large or small pores, which is loaded with displacing agent, a large portion of the displacing agent is desorbed very rapidly because of the presence of the sievate. With the type A or smaller pore sieves the sievate is not adsorbed into the bed itself and serves only to reduce the partial pressure over the bed and thereby desorb the displacing agent. When utilizing the larger pore beds, i.e., a 13X sieve, the sievate is attracted to the bed, although not to the same extent as the displacing agent. In this case the presence of the sievate serves to flush the displacing agent from the bed. Due to this rapid desorption the capacity of the molecular sieve bed for lighter hydrocarbons is greatly increased.

Thus, in accordance with applicants' invention it has unexpectedly been found that introducing into the separation zone a small controlled amount of sievate will desorb a tightly held displacing agent from the sieve bed. This separation is both quick and almost complete in its nature. This result is particularly surprising and unexpected in view of the fact that the sievate is nonadsorbable with the smaller pore sieves and has less attraction to the larger pore or type X sieve than does the displacing agent which is on the molecular sieve itself. A further unexpected facet of this invention is the fact that the feed containing adsorbable hydrocarbon cannot sufficiently displace the displacing agent from the sieve so as to obtain maximum adsorption of lighter weight components.

Sievate amounting to between $1 \times 10^{-4}$ and $4 \times 10^{-2}$ moles/w., preferably $3 \times 10^{-4}$ and $1 \times 10^{-3}$ moles/w., and most preferably, between $1 \times 10^{-3}$ and $4 \times 10^{-3}$ moles/w. is passed to the bed. The displacing agent level is reduced by 10 to 90%. The sievate is preferably introduced in the same direction as the feed stock had been introduced previously but may be introduced in a countercurrent direction also.

The displacing agent is defined as a polar or polarizable material having an appreciable affinity for the zeolitic adsorbent compared with the material desired to be desorbed. The displacing agent will generally have a heat of desorption approximately equal to the material it is desired to desorb. Displacing agents are also referred to as desorbents, displacing agents and desorbing mediums. Suitable displacing agents for the process of this invention include $SO_2$, ammonia, carbon dioxide, $C_1$–$C_5$ alcohols such as methanol and propanol, glycols such as ethylene glycol and propylene glycol, halogenated compounds such as methyl chloride, ethyl chloride, methyl fluoride, nitrated compounds such as nitromethane, and the like. Preferably, the displacing agents are used in a gaseous state. A preferred displacing agent has the general formula:

wherein $R_1$, $R_2$ and $R_3$ are selected from the group consisting of hydrogen and $C_1$–$C_5$ alkyl radicals.

Thus, the desorbing material includes ammonia and the $C_1$–$C_5$ primary, secondary and tertiary amines with ammonia being preferred and the $C_1$–$C_5$ primary amines being next in order of preference. Examples of preferred primary amines include ethylamine, methylamine, butylamine and the like. Of course the displacing agent used must have its critical dimension small enough to enter the molecular sieve being used.

With respect to the operating conditions of the instant invention the temperature if the operation is to be conducted in the vapor phase should be about 400° to 800° F., preferably 500° to 750° F. and most preferably 550° to 700° F. The pressure may vary within wide ranges but should be between 1 to 100 p.s.i.a., preferably 10 to 50 and most preferably 15 to 50 p.s.i.a. The amount of feed per cycle should be .01 to 10 w./w., preferably 0.2 to 5 w./w. and especially preferred 0.3 to 3.0 w./w. The desired amount of displacing agent used should be 0.01 to 5 w./w., preferably 0.02 to 3 and most preferably 0.06 to 2 w./w. per cycle based on the amount of adsorbent.

Figure 1:
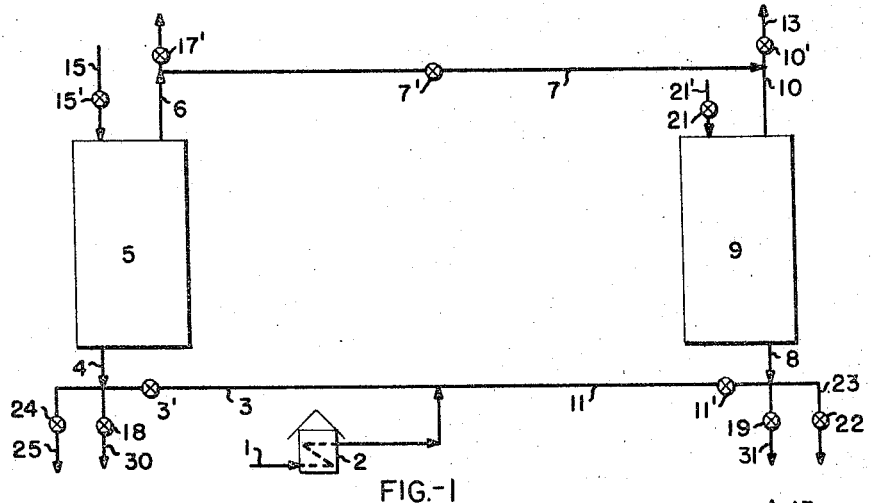
FIGURE 1 is a schematic view of a two-bed system for carrying out the instant invention.

Turning now to FIGURE 1, the hydrocarbon feed may comprise fractions in the $C_2$–$C_{16}$ range distilled from various crude oils or natural gas. Feeds used may also be from conversion processes such as isomerization, catalytic reforming, catalytic cracking or thermal cracking. Feed which, for example, may be a virgin distillate containing normal paraffins, isoparaffins, cycloparaffins and aromatics, is introduced through line 1 into heater 2. Within heater 2, the feed is heated to a temperature of 400° to 800° F., preferably 500° to 700° F. The heated feed is removed through line 3, passes through valve 3', which is open, while valves 11' and 18 and 24 are closed, and then into line 4 from whence it is transported into sieve bed 5. Within said bed 5 is a molecular sieve which may be any molecular sieve, as mentioned earlier, but in this case has Angstrom openings of 5 A. size. The sieve may contain a minor amount of displacing agent but contains a large amount of sievate. Normal paraffins are adsorbed on the sieve bed 5. Included in these paraffins are the lighter weight paraffins of $C_4$–$C_{12}$, preferably $C_5$–$C_9$. The sievate or nonadsorbed portion is removed through line 6. Sievate composition is that of feed with the normal paraffins removed. At this time, valve 17' may be closed or partially open. At least some of the sievate passes through line 6 from whence it is transported into line 7 and through valve 7' and finally into line 10. At this time, valve 10' is closed. The sievate is transported into the bed 9. It should be noted that the sievate may be passed through a condenser, which is not shown, in order to separate sievate and displacing agent, and then may be revaporized for introduction to bed 9.

Sieve bed 9 has already been subjected to normal paraffin displacement and is now loaded with a displacing agent which may be ammonia. The sievate which enters bed 9 serves to desorb a substantial amount of the displacing agent. In fact, about 10–90% of the displacing agent is desorbed and leaves bed 9 through lines 8, 23, and valve 22 which is open. At this time, valves 19 and 11' are closed. The mixture is cooled and the sievate condensed and separated from displacing agent by means not shown. Bed 9 now has a reduced ammonia loading and is ready for adsorption. Feed is introduced into bed 9 through line 1, heater 2, line 11, valve 11', which is open, which valves 3', 22, and 19 are closed, and line 8. The feed contains about 20% of light normal paraffins falling into the range of $C_4$–$C_{12}$. Sievate consisting of isoparaffins, cycloparaffins and aromatics, together with displacing agent, leaves bed 9 through line 10. Valve 10' is opened partially so that as much sievate as desired may be directed through line 13. Valve 10' is closed and valve 7' opened when sievate for purging is desired. After this, the flow of feed is stopped prior to the introduction of displacing agent into the bed. Analysis of the sievate by chromatographic means indicates that from 70–99% of the light hydrocarbons in the range of $C_4$–$C_{12}$ has been removed. This is a considerable improvement over previous yields. Valve 21 is now open, while valves 11' and 7' are closed, and displacing agent is introduced through line 21'. The displacing agent after passing through valve 21 passes into said bed 9. Normal paraffins which include an especially high concentration of lighter normal paraffins falling into the range of $C_4$–$C_{12}$ are recovered through line 8, valve 19 and line 31. About 70–99% of the light normal hydrocarbons which were originally introduced into the bed are recovered. This is an increase of 10–200% over the usual recovery of light normal hydrocarbons.

Returning to bed 5 at a point in time prior to the stopping of feed introduction to bed 9, displacing agent, which in its preferred form would be ammonia, is introduced through line 15 and valve 15'. Normal paraffins, including a high proportion of lighter weight normal paraffins, are displaced from bed 5 through line 4 and valve 18 and line 30. At this time, valves 3' and 24 are closed. After the bed has been loaded with displacing agent and it is desired to remove the displacing agent, valves 18 and 3' are closed. Valves 24 and 7' are open and sievate from bed 9 passes through line 7 into line 6. Valve 17' is closed. Sievate passes through line 6 and into bed 5. Displacing agent and sievate are then removed through line 4, valve 24, which is open, and line 25. This is continued until the desired amount of displacing agent has been removed from the bed at which time it is stopped. At this time, bed 5 is ready to have feed reintroduced.

Figure 2:
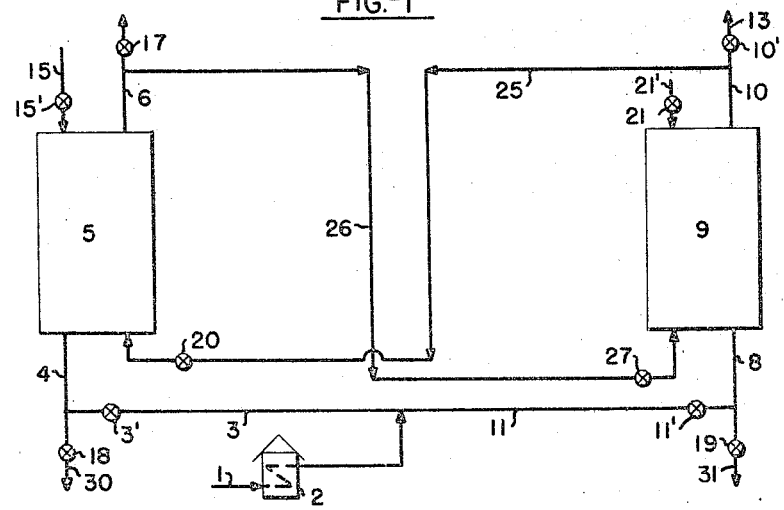
FIGURE 2 is a schematic view of an alternate two-bed system for carrying out the instant invention.

Turning to FIGURE 2, this drawing is substantially the same as FIGURE 1. However, it contains one additional feature which differentiates it. In fact, in many instances, this will be the preferred format. The sievate in line 10 is drawn off through line 25 while valve 10' is closed. Line 25 contains valve 20 which is open and after passing the valve 20, the sievate enters into sieve bed 5. In this manner, the sievate may be introduced into sieve bed 5 in the same direction as the feed stock is introduced into the sieve bed. In similar fashion, sievate from bed 5 may be withdrawn from line 6 while valve 17' is closed and introduced into line 26 from whence it passes through valve 27 and into sieve bed 9. Once again, the sievate is introduced into the bed in the same direction as the feed stock is introduced into the bed. In addition, valves 22 and 24 and lines 23 and 25 of FIGURE 1 are eliminated as no sievate is removed from the beds at the feed entrance ends.

Figure 3:
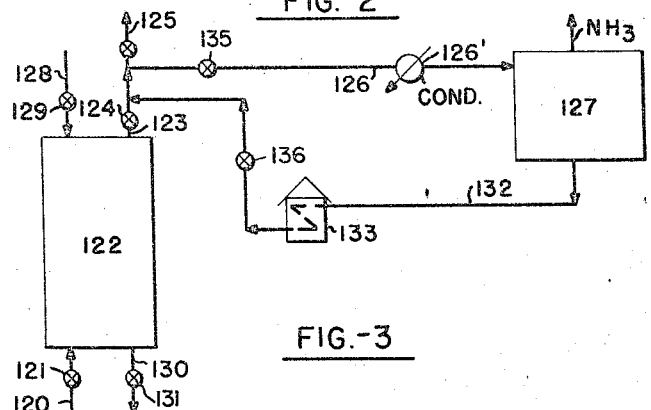
FIGURE 3 is a schematic view of a one-bed system for carrying out the instant invention.

Turning now to FIGURE 3, the one-bed modification of this process is disclosed. Feed is introduced into the bed through line 120 and valve 121 at 400° to 800° F. Bed 122 contains a molecular sieve, which in this case is a 5 A. molecular sieve but may be any of the earlier disclosed sieves. The feed in this case is the same virgin distillate utilized containing about 20% of light normal paraffins. The normal paraffins are absorbed onto bed 122 and the sievate which consists of feed without normal paraffins is passed out of bed 122 through line 123, passes through valve 124 and from there travels through valve 135 into line 126. Valve 136 is closed at this point. Valve 125 is closed or partially open at this point to allow the removal of none or some of the sievate from the system. From line 126, the sievate travels to storage in container 127 after being condensed in condenser 126'. Displacing agent, which in this case is ammonia, is fed into line 128, passes through valve 129 and into sieve bed 122. Normal paraffins are displaced by the ammonia through line 130 and valve 131. After the bed has been loaded with ammonia, sievate is passed from vessel 127 through line 132, vaporizer 133, valves 136 and 124, line 123 and then into sieve bed 122. At this point valves 125, 135, 129 and 121 are closed. The sievate desorbs the ammonia which is removed through line 130 and valve 131. This step desorbs 10 to 90% of the ammonia. After this, fresh feed is once again introduced into the bed and desorbed in the manner outlined above. As a result, a 10 to 200% increase in capacity for the lighter straight chain normal paraffins in a range of $C_4$–$C_{12}$ as compared to an operation where the bed had not been swept of ammonia with sievate is observed. This desorption has been given in terms of a normal paraffin separation. It is also applicable to increasing the recovery of lighter weight aromatics, as has been mentioned previously. The invention is further illustrated by the following examples.

*Example 1*

An adsorption process utilizing a system identical to FIGURE 1 is carried on with a 5 A. molecular sieve in both beds 5 and 9. The inventive process of the instant invention is utilized in this example. A distillate cut of crude oil which contains $C_4$–$C_{12}$, as well as $C_5$–$C_9$ normal paraffins, is fed to an adsorption zone. The remainder of the feed comprises one-third isoparaffins, one-third aromatics and one-third cycloparaffins. The normal paraffins in the range of $C_5$–$C_9$ comprise 20% of the entire feed stock. The feed is first heated to a temperature of 600° F. in furnace 2, then is passed through line 3, valve 3', which is open, while valves 18 and 24 are closed, into line 4 and from there into sieve bed 5. Sieve bed 5 contains sievate which has previously been utilized to desorb displacing agent, which was ammonia, from bed 5 in the manner previously described. The sievate which consists of the feed minus the lighter normal paraffins passes out of the sieve bed 5 through line 6. Feed rate is 0.96 w./w./hr. The feeding of fresh feed into the sieve is stopped at the end of ten minutes, at which time concentration of $C_6$ straight chain normal paraffin in the effluent has reached about 10% of the feed concentration. The original feed concentration of lighter normal paraffins is as follows:

| Normal paraffins: | Wt. percent |
|---|---|
| $NC_5$ | 1.0 |
| $NC_6$ | 6.0 |
| $NC_7$ | 6.0 |
| $NC_8$ | 6.0 |
| $NC_9$ | 1.0 |

The loading of normal paraffins of the $C_5$–$C_9$ variety at the end of the feed step is 0.032 w./w.

Sievate is passed through line 7, valve 7', which is open, and into line 10. At this time valves 17' and 10' are closed. Sieve bed 9 has already been desorbed with a displacing agent which is ammonia. The sievate with the displacing agent removed from it is introduced into the bed and almost immediately, the ammonia is desorbed from the bed through line 8, valve 22 and line 23. Valves 19 and 11' are closed at this time. In this fashion, about 25 wt. percent of ammonia on the bed is removed. Subsequent to this, fresh feed is passed through line 1, heater 2 where it is heated to 600° F., line 11, valve 11' and line 8 into sieve bed 9. At this time, valves 3', 19 and 22 are closed. The feed is passed through bed 9 for a period of about 10 minutes at which time the concentration of normal $C_6$'s in the effluent has reached 10% of the feed normal $C_6$ concentration. The flow of feed is stopped at this point. An analysis by means of chromatography is made of the constituents adsorbed on sieve bed 9. It is found that the loading of lighter normal paraffins, $C_5$–$C_9$, is 0.032 w./w. These normal paraffins are then displaced by means of the displacing agent, ammonia, which is introduced through line 21' and valve 21. The normal paraffins are recovered after passing through line 8, line 31 and valve 19. Valves 11' and 19 are closed. The sievate which passes out of bed 9 during the feed step is allowed to escape in part through valve 10', but this valve is subsequently closed when sievate is desired to be obtained for purposes of purging bed 5 of displacing agent. At that time, valve 10' is closed and valve 7' is open.

*Example 2*

In this example, the exact conditions of Example 1 are utilized with the exception that no sievate is utilized to desorb the displacing agent. That is to say, fresh feed is introduced into sieve beds 5 and 9 immediately after the displacing agent has been introduced.

Chromatographic analysis of the hyydrocarbon effluent of sieve bed 9 after introducing fresh feed for only about 5 minutes indicates that the concentration of normal $C_6$'s in the effluent is 10% of feed normal $C_6$ concentration. The loading of lighter normal paraffins is only 0.016 w./w. This indicates a far less efficient loading of the sieve with normal paraffins when there is no desorption of displacing agent from the bed with sievate previous to the introduction of normal paraffins into the bed. An increase in derivative of loading on beds 5 and 9 in Example 1 indicates that these beds are capable of adsorbing considerably more lighter normal paraffins than a bed which is not swept clean of displacing agent as in Example 2.

Alternately, an apparatus substantially identical to that of FIGURE 2 may be utilized. The conditions are identical to FIGURE 1 except that instead of being passed through line 7, the sievate coming from bed 9 is passed through line 25 and valve 20 before it enters bed 5, and the sievate from bed 5 passes through line 26 and valve 27 before entering sieve bed 9. An analysis of sieve bed 9 after an adsorption step with the same feed of Example 1 indicates a lighter normal paraffin loading of about 0.032 w./w. The adsorption step came subsequent to the desorption of displacing agent from sieve bed 9 means of sievate which is passed through line 26 and valve 27.

An area in which lighter weight normal paraffins are playing an increasingly more important role is that of hydrocarbon solvents. Normal paraffins have a low solvency relative to naphthenes and aromatics. Thus, in applications in which low solvency is required such as used in certain paints, normal paraffins of the lighter variety are highly desirable. The separation of aromatics and nonhydrocarbons from petroleum stocks in the $C_5$–$C_{12}$ range has also become increasingly important in recent years. The removal of aromatics from feedstocks makes them desirable solvents for food processing. Reduction in the aromatics content gives the solvents lower solvency which is desirable in some applications in the paint industry. The removal of aromatics also raises the smoke point of kerosene and the luminometer number of jet fuels. Removal of nonhydrocarbons increases the stability to jet fuel of all of these products. The recovered adsorbed lighter aromatics have high solvency which is also desirable in the rubber industry.

Thus, the improvement of the instant invention with respect to increasing the amount of lighter of hydrocarbons which are adsorbed onto a molecular sieve will present a great number of advantages.

Although, the instant invention has been described with some particularity it is understood that it is intended only to be limited by the attached claims.

What is claimed is:

1. A molecular sieve separation process wherein a feed stream is passed into a molecular sieve separation zone and at least a portion of said feed is adsorbed in said zone and the remaining nonadsorbed portion of said feed stock passes out of the said zone as sievate which comprises: (a) passing a hydrocarbon feed stream, at least a portion of which is adsorbable, into a molecular sieve separation zone whereby the said adsorbable portion is adsorbed on the said sieve; (b) displacing said adsorbed hydrocarbon with a displacing agent whereby said displacing agent is adsorbed on said bed; (c) stripping said displacing agent from said bed by passing sievate over said bed until a substantial portion of said displacing is removed.

2. The process according to claim 1 wherein said adsorbable hydrocarbon comprises a normal paraffin of $C_4$–$C_{12}$.

3. The process according to claim 1 wherein the said displacing agent is

wherein $R_1$, $R_2$ and $R_3$ are selected from the group consisting of $C_1$–$C_5$ alkyl radicals and hydrogen.

4. The process according to claim 2 wherein said feed stock is passed over said bed of adsorbent at a temperature of 400° to 800° F.

5. The process according to claim 2 wherein said displacing agent is ammonia.

6. The process according to claim 1 wherein the said adsorbable portion of the said feed stock is a normal olefin of $C_4$–$C_{12}$.

7. The process according to claim 1 wherein said feed stock is a $C_4$–$C_{12}$ normal hydrocarbon.

8. The process of claim 1 wherein the said adsorbable hydrocarbon is an aromatic hydrocarbon containing no more than 12 carbon atoms.

9. The process of claim 7 wherein the said sievate is introduced into the said molecular sieve in the same direction as the said feed stock had been introduced into the said sieve.

10. The process of claim 8 wherein the said sievate is introduced into the molecular sieve zone in the opposite direction from that which the feed stock was introduced.

11. In a multisystem molecular sieve separation process in which a portion of the feed stock introduced into the molecular sieve separation zone is adsorbed and the remainder of the said feed stock passes out as sievate which comprises: (a) passing a feed stock into a fiirst molecular sieve separation zone, said feed stock containing an adsorbable hydrocarbon whereby said adsorbable hydrocarbon is adsorbed onto the said molecular sieve and the remainder of the said feed stock passes out as sievate; (b) passing at least a portion of this sievate from the said first adsorption zone into a second adsorption zone, said second zone containing a displacing agent whereby a portion of said displacing agent is displaced by said sievate; (c) passing feed stock into said second molecular sieve separation zone whereby the said adsorbable portion of said feed stock is adsorbed onto said molecular sieve, and sievate and displacing agent pass out of the said molecular sieve separation zone; and (d) desorbing said adsorbed hydrocarbon from said second molecular sieve separation zone with a displacing agent.

12. The process of claim 11 wherein the said adsorbed hydrocarbon is a $C_4$–$C_{12}$ normal hydrocarbon.

13. The process of claim 11 wherein the said adsorbed hydrocarbon is a $C_4$–$C_{12}$ normal paraffin.

14. The process of claim 11 wherein the said adsorbed hydrocarbon is an aromatic hydrocarbon having a maximum of 12 carbon atoms.

15. The process of claim 13 wherein the said desorbing agent is

wherein $R_1$, $R_2$ and $R_3$ are selected from the group consisting of $C_1$–$C_5$ alkyl radicals and hydrogen.

16. The process of claim 13 wherein said displacing agent is carbon dioxide.

17. The process of claim 13 wherein said displacing agent is hydrogen sulfide.

18. The process of claim 13 wherein said displacing agent is ammonia.

19. The process of claim 13 wherein the said sievate is introduced into the said adsorption zones in the same direction as the said feed stock.

20. The process of claim 1 wherein the said displacing agent is a polar compound.

References Cited by the Examiner

UNITED STATES PATENTS

| | | | |
|---|---|---|---|
| 2,899,379 | 8/1959 | Wilchinsky et al. | 208—310 |
| 2,996,558 | 8/1961 | Feldbauer | 208—310 |
| 3,248,322 | 4/1966 | Asher | 208—310 |
| 3,251,765 | 5/1966 | Mowill | 208—310 |

ALPHONSO D. SULLIVAN, *Primary Examiner.*